Sept. 23, 1930.  G. O. JOYNER  1,776,360
SPRING MOTOR
Filed Dec. 20, 1928  2 Sheets-Sheet 1
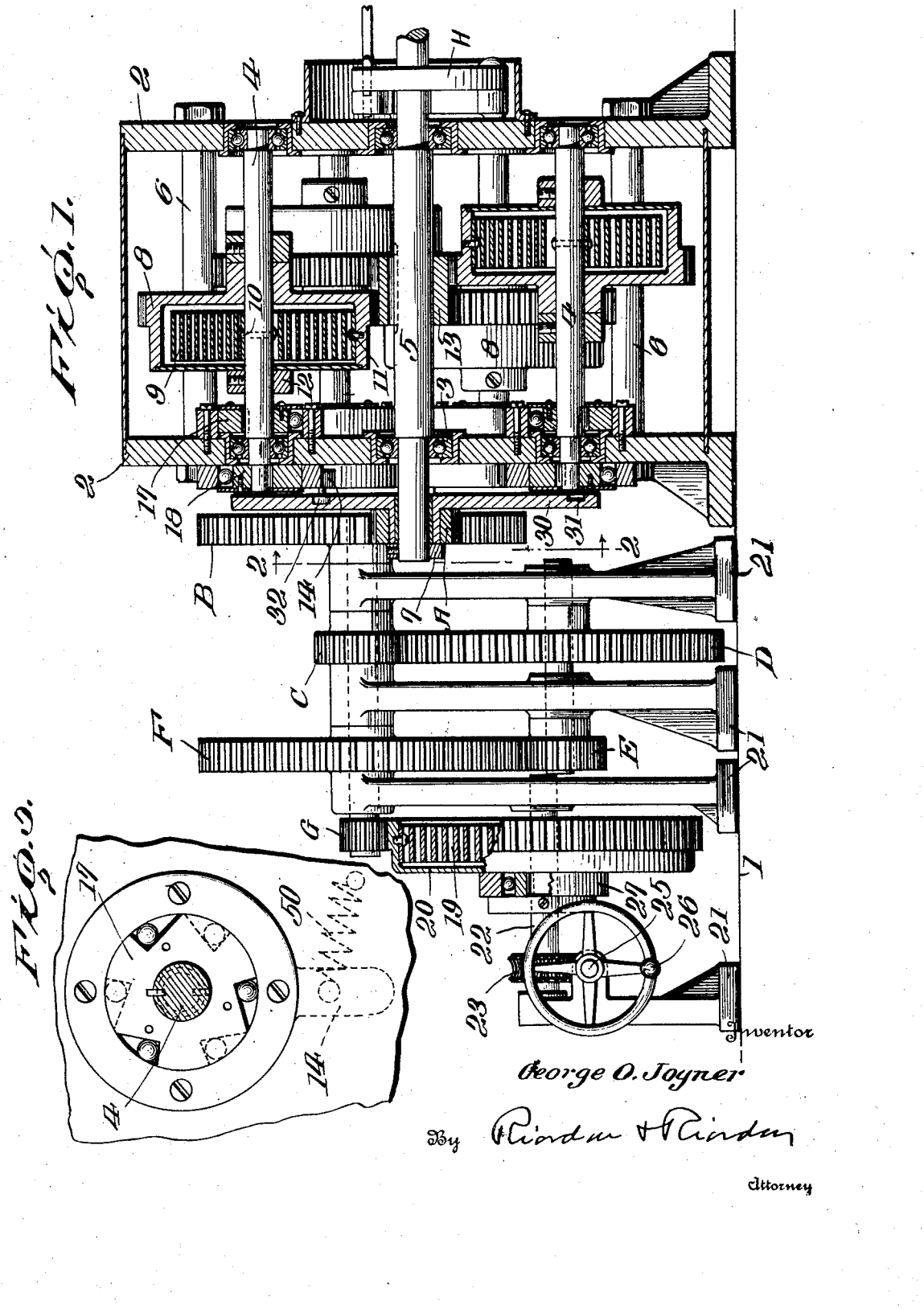
Inventor
George O. Joyner
By Riordan & Riordan
Attorney

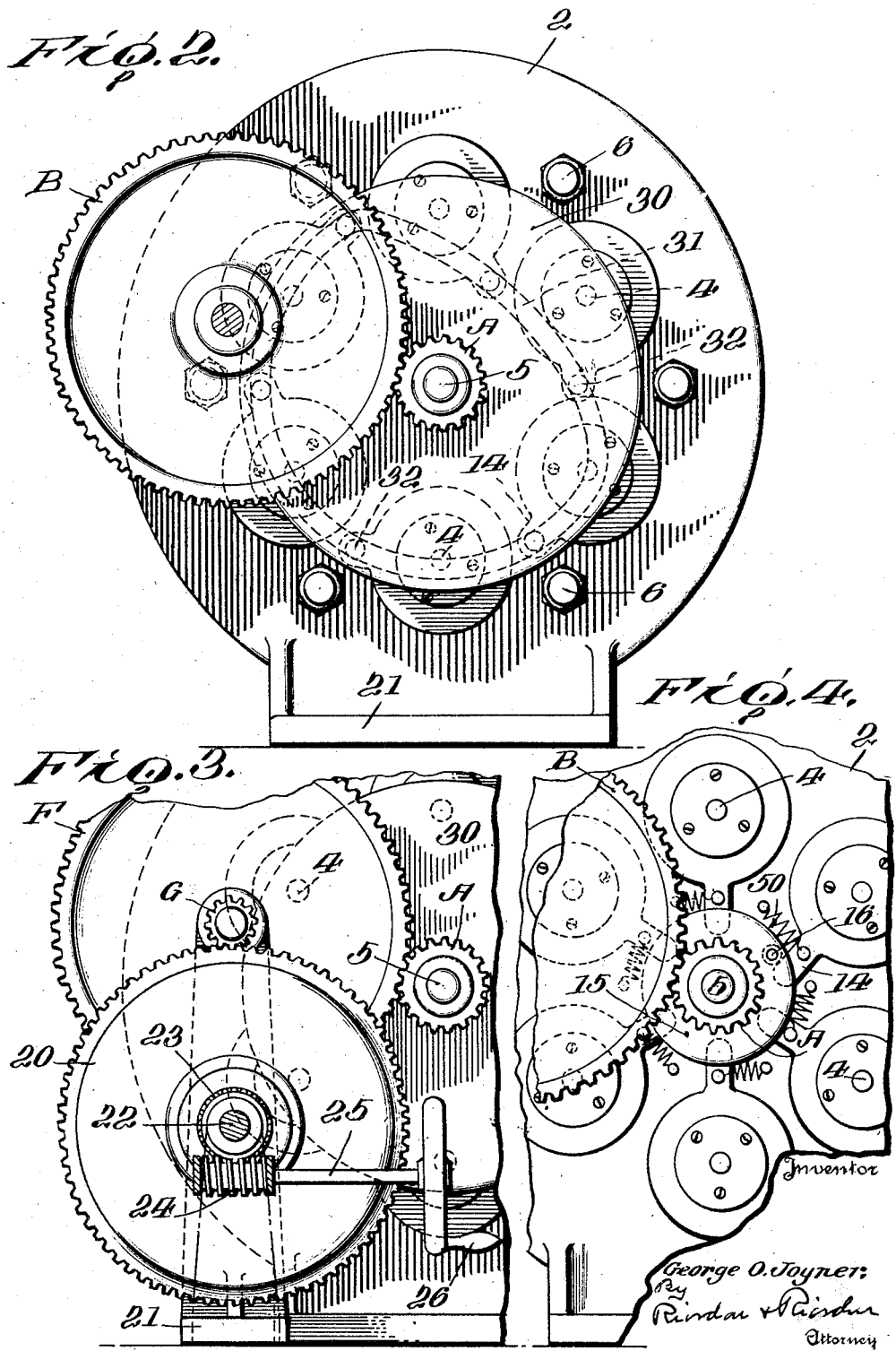

Patented Sept. 23, 1930

1,776,360

UNITED STATES PATENT OFFICE

GEORGE O. JOYNER, OF ST. LOUIS, MISSOURI

SPRING MOTOR

Application filed December 20, 1928. Serial No. 327,320.

The present application is a continuation in part of my prior application Serial No. 298,781, filed August 9th, 1928, and contains the entire subject matter thereof, together with certain improvements thereon.

This invention relates to spring motors, an object being to provide a motor which is dependent for its operation upon a series of springs geared to a power shaft in such a manner that all contribute to furnish power thereto, in combination with means for rewinding the springs as needed.

Another object is to provide a plurality of springs geared to a line or power shaft in such a manner that all contribute to furnish power, and whereby breakage of one or more will not stop the motor.

A further object is the provision of a plurality of springs which are utilized to store up power for operation of a power shaft, means being provided to replenish the stored up power, when and as it is given off to the shaft.

Still another object is the provision in a motor of this nature, of a master spring of great capacity, as compared with the shaft operating springs, which acts to rewind or replenish the stored up energy of the latter springs, this master spring being itself rewound when necessary by hand or by any suitable means, as a motor. The operation of the spring motor itself, of course, is not dependent upon consumption of fuel as the stored up energy of the master spring acts to provide and permit the continued operation of the motor until said master spring is exhausted.

The spring motor described herein maybe used for the economical and dependable operation of electric generators, refrigerating devices, and in fact any machinery utilizing power. The motor can also be used for light machinery as a fan, sewing machine or toy. Its uses as a toy may vary from the strict motor field to that of educational and constructional toys.

Other and further objects will appear as the description proceeds, the invention being illustrated in the accompanying drawings and hereinafter fully described, the novel features being particularly pointed out in the appended claims.

In the drawings:—

Fig. 1 is an elevation, partly in section of a motor embodying the invention;

Fig. 2 is a view on line 2—2 of Fig. 1 in the direction of the arrows;

Fig. 3 is a partial end view showing details, taken at the left of Fig. 1;

Fig. 4 is a view similar to Fig. 2, but illustrating a modification in the invention; and Fig. 5 is a detail of the clutch mechanism of Fig. 4, this detail being enlarged.

The motor is set up on a suitable bed plate or foundation, indicated at 1, and includes end plates 2 in which are set ball bearings 3 to journal the central line shaft 5 and the spring shafts 4 which are arranged in a circular series concentric with the line shaft, the line shaft being connected operatively with the machinery to be driven. It will be understood that the line shaft may be equipped with a brake H so that it may be stopped when desired without waiting for the springs to run down. The end plates are connected by tie-rods 6 provided in sufficient number to attain the desired rigidity.

Mounted loosely on each spring shaft 4 is a hollow gear 8 which houses a volute spring 9 and meshes with a pinion 13 keyed to the line shaft 5. Each spring 9 is secured at one end to its shaft 4, as at 10, and at its opposite end to its respective gear, as at 11, and the gear is held against movement along the shaft by stop collars 12. Each spring shaft has inner clutch members 17 and outer clutch members 18, secured thereto, said members each consisting of a disk having cam notches in its periphery receiving balls adapted to wedge between said disk and a clutch ring encompassing the disk. As this clutch per se is conventional, no detailed description is necessary, the use and operation thereof being hereinafter described. An arm 14 is connected rigidly to the encompassing ring about the clutch disk 18, and when moved about the axis of shaft 4, causes a wedging of the balls in the cam notches, thereby locking the ring to disk 18 which is keyed to shaft 4 and accordingly, shaft 4 will be rotated substantially the same extent as the arm 14.

In one form of this invention, the arm 14 is held by a spring 50, (Figs. 4 and 5) so that its free end is normally in the path of a tappet 16 (Fig. 4) which may be mounted on the side of a disk 15 which is mounted for free rotation on the line or power shaft 5 and prevented from sliding off the same by a collar 7.

The number of tappets may be varied in accordance with individual requirements, but preferably a range of movement, or a series of movements will be imparted by successive tappets, as to give the spring shaft 4 a complete turn during each turn of the disk 15.

As the tappet passes an arm 14, the inner clutch 17 comes into play. The encompassing ring of this clutch is fast to the frame or end plate 2, while the clutch disk 17 is keyed to the shaft, with its notches oppositely disposed relative to those of clutch 18. Once the tappet 16 passes the arm 14, there is a tendency in spring 9 to reverse the movement of shaft 4, and immediately a wedging of the balls in clutch 17 occurs, thus holding the shaft against retrograde or unwinding movement. All energy of the spring will accordingly be transmitted to the gear 8, which is connected to the end of the spring opposite that attached to the shaft 4.

A pinion A is fixed on the hub of the disk 15 and meshes with a gear B and upon the axle or shaft of said gear B is fixed a pinion C, the pinion and gear thus rotating in unison. The pinion C meshes with a gear D, and a pinion E is connected concentrically with the gear D to rotate therewith, said pinion E meshing with a gear F with which a pinion G is concentrically connected. The pinion G meshes with a hollow gear 20 within which is housed the main winding spring 19 secured at its outer end to the gear and at its inner end to the shaft 22 upon which the gear is loosely mounted, all of the described train of gearing being supported by pedestals 21. Upon the outer end of the shaft 22 is a worm pinion 23 which meshes with a worm 24 on a shaft 25 which is equipped at its front end with a crank wheel or handle 26.

A clutch 27 is provided between the shaft 22 and gear 20, this clutch being similar to the clutches 17 and 18, its function being to prevent retrograde movement of the gear on the shaft. The clutch will bind to prevent relative movement in one direction, but to permit relative movement in the opposite direction, thus enabling the spring to unwind or be wound, as the case may be.

In order to wind up the motor in the first instance, manual or any other preferred power is applied to turn the crank wheel 26 or otherwise rotate the shaft 25, and such rotation of the shaft 25 acts upon the shaft 22 to wind the spring 19. When the spring 19 is fully wound it will pull upon the gear 20 to rotate the same so that if the manual rotation of the shaft 25 be continued the train of gearing will be set in motion to rotate the disk 15 without unwinding the spring 19. When the rotation of the disk 15 brings a tappet 16 against an arm 14, the arm swings against the tension of the attached spring 50 and the balls of clutch on the arm engage the cooperating cam recesses so as to partly turn the corresponding spring shaft 4. As the tappet clears the rocking arm, the arm moves freely on the shaft to return the initial position but the inner clutch will then bind upon the shaft and hold the winding of the spring 9. Eventually in this manner, the spring 9 will be fully wound and if the brake on the line shaft then be released and the crank wheel 26 locked, the line shaft will be rotated. The main spring 19 will now tend to unwind and will thereby continue the rotation of the disk 15 so that the springs 9 will be rewound while they are rotating the line shaft so that the motor will run for a long time on a single wind, and the period of time required for the spring 19 to unwind and thereby cease its rewinding action on the springs 19 will depend upon the gear ratio.

The springs which act on the line shaft are rewound without any cessation in the continuity of transmission of power to the line shaft, and they do not lose any appreciable degree of their power before they are rewound. By varying the number of springs, the motor may be adjusted to any desired horse power and the breaking of one spring will reduce the power, but will not have any other effect, and, of course, the speed of the motor may be varied by changing the ratio of the gears whereby the power is transmitted from the springs to the line shaft.

It will be appreciated, that inasmuch as the rewinding of the springs 9 is caused by a movement of the shaft 4 through one end 10 of the spring 9, and movement of the gear 8 as the spring unwinds, is taken from the other end 11, that the springs 9 may be rewound without cessation in the transmission of energy to the shaft 5. It is merely necessary, if the spring is to be maintained in wound condition, that a sufficient winding moment be provided, either constantly, or intermittently, to compensate for the unwinding moment, and this is accomplished by use of the spring 19. Similarly, the spring 19 can be rewound during its operation of rotating shaft 22, by the use, when necessary of hand power, motor power or the like.

Obviously, the gears, springs, tappets, &c., can be proportioned and arranged for any suitable predetermined amount of rewinding and tensioning, and the amount of power applied to the line shaft, considered in terms of storage hours, can be varied by varying the size of the springs and the size of the gears. For example, the disk 15 may have five tappets 16, working in harmony with the six arms 14 attached to the spring shaft 4 of the power unit. Six clutches will be placed inside of the end plate 2, to the arms 14 on the spring shafts 4 and attached to the end plate 2, while six other clutches may be placed on the arms 14 that operate on the spring shafts 4, so that the spring shafts 4 will be kept in position at certain intervals. With this arrangement the five tappets 16 will turn each arm 14 attached to the spring shafts 4, a complete revolution for each complete revolution of the disk 15. In this particular example the six springs 9 will be kept energized and transmitting their power to the line shaft 5 without disengaging any of the six springs 9, while they are being rewound.

The six springs 9 in the example given will never unwind or lose but one fifth, or one third of a turn of their energy at any time, because the springs will be wound from the center 10 as fast as they transmit their power through the housing gear 8, the gear 13, on the line shaft, by the running disk 15. The master spring 19 will keep the springs 9 wound for several hours and while the six springs 9 in the power unit will in effect retain their power, due to replenishment of energy from the master spring, this master spring will, of course, in time lose its energy and be re-energized. The length of time that it will retain its energy is dependent solely upon the size of the spring used and the gear ratio between said spring and the power spring 9.

It may be preferable to use a different means of actuating the shafts 4, in rewinding the springs 9, and in Figs. 1, 2 and 3, is illustrated a very desirable mechanism which has the advantage of being quieter in operation than the type using tappets 16, and also smoother in transmission of energy.

In this form, a cam disk 30 is utilized in place of the tappet disk 15, a cam groove 31 being cut in one face of this disk. The arms 14 then, instead of having springs 50 and long tappet engaging ends, are provided with rollers 32 which are offset from the arms, to ride in the cam groove or track. By suitably shaping and proportioning the track, the desired movement will be given to arms 14 and shafts 4 as the disk 30 is rotated. For example, in Fig. 2 the flat portion of the track corresponds to the tappet engaging portion of Fig. 4.

An example of the form and operation of this cam groove type of device may be given somewhat as follows:—Assuming that the gear 8 is in a seven to one relation to the gear 13, thus creating a seven to one gear ratio, therebetween and the arm 14 which is carried on shaft 4 has a length of two inches which would create a four-inch circle or diameter, if the arm could pass through a complete circle, then the cam and arms 14 will be so proportioned that the cam will lift the arm one-seventh of its own four-inch circle. This will cause a rewinding of the spring 9 exactly the amount that has been unwound in the rotation of the gear or housing 8, which is in a seven to one ratio with respect to the gear 13. Of course, if the ratio of gears is varied from the seven to one ratio to any other suitable or desirable ratio, then, of course, the amount of lift given the arm 14 will be proportionately varied.

The operation of the machine using a cam groove is otherwise similar to the motor using tappets and spring-held arms.

Other variations might be made within the scope of this invention, and the motor might be designed for use as a toy, or as a machine power plant, and I do not intend to be limited, except as in the claims appended hereto.

Having thus described my invention, what I claim as new and desire to secure by Letters Patent of the United States, is:—

1. A motor comprising a line shaft, a plurality of shafts arranged concentrically about the line shaft and geared thereto, springs acting on the plurality of shafts, and means for winding the springs, comprising a master spring geared to said motor.

2. A motor, comprising a line shaft, a plurality of shafts arranged concentrically about the line shaft and geared thereto, springs acting on the plurality of shafts, and automatically acting controlled spring means for winding the springs during operation of the motor.

3. A motor comprising a line shaft, a plurality of spring shafts arranged concentrically about the line shaft and geared thereto, motor springs attached to the spring shafts and the gears thereon, a plurality of rocker arms, means for actuating said arms, and means whereby movement of said arms in one direction will turn the spring shafts and wind the springs, and movement of the arms in the opposite direction will be free of the shaft.

4. In a spring motor, the combination of a power unit and a rewinding unit therefor, said power unit comprising a power shaft, a plurality of power springs spaced adjacent said shaft, and geared thereto whereby energy of the springs will be transmitted to said shaft, said rewinding unit comprising a spring of relatively larger capacity than said power springs, and geared to said power springs, whereby they may be rewound, and means in the gearing between said rewinding spring and said power springs adapted to permit flow of energy from said rewinding spring to said power springs in one direction only.

5. In a spring motor, the combination of a power unit and a rewinding unit therefor, said power unit comprising a power shaft, a plurality of power springs spaced adjacent said shaft and geared thereto whereby energy of the springs will be transmitted to said shaft, a supporting shaft for each of said springs, said rewinding unit comprising a spring of relatively larger capacity than said power springs and geared to said power springs, whereby they may be rewound, and means in the gearing including a one-way clutch on each of said power spring shafts between said rewinding spring and said power springs adapted to permit flow of energy from said rewinding spring to said power springs in one direction only.

6. In a spring motor, the combination of a power unit and a rewinding unit therefor, said power unit comprising a power shaft, a plurality of power springs spaced adjacent said shaft and geared thereto whereby energy of the springs will be transmitted to said shaft, said rewinding unit comprising a spring of relatively larger capacity than said power springs and geared to said power springs whereby they may be rewound, means in said gearing to control the flow of energy from said rewinding spring to said power springs whereby the amount of energy furnished an individual spring may be predetermined, and means in the gearing between said rewinding spring and said power springs adapted to permit flow of energy from said rewinding spring to said power springs in one direction only.

7. A motor comprising a line shaft, a plurality of spring shafts arranged concentrically about the power shaft and geared thereto, power springs each attached at one end to its shaft and at the other end to the gearing, a plurality of actuating arms mounted one on each shaft, means for actuating each of said arms, and means whereby movement of an arm in one direction will rotate the shaft on which it is mounted and wind the spring attached thereto.

8. A motor comprising a line shaft, a plurality of spring shafts arranged concentrically about the power shaft and geared thereto, power springs each attached at one end to its shaft and at the other end to the gearing, a plurality of actuating arms mounted one on each shaft, cam means to actuate the arms, and means whereby movement of an arm by the cam will rotate the shaft on which it is mounted and wind the spring attached thereto.

9. A motor comprising a line shaft, a plurality of spring shafts arranged concentrically about the power shaft and geared thereto, power springs each attached at one end to its shaft and at the other end to the gearing, a plurality of actuating arms mounted one on each shaft, means comprising a cam groove engageable with said arms for actuating the same, said groove being profiled to give said arms an oscillatory movement, and means whereby movement of the arms in one direction will turn the spring shafts to wind the spring and movement of the arms in the opposite direction will be free of the shaft.

10. A motor comprising a line shaft, a plurality of spring shafts arranged concentrically about the power shaft and geared thereto, power springs each attached at one end to its shaft and at the other end to the gearing, a plurality of actuating arms mounted one on each shaft, means for actuating each of said arms, and means whereby movement of an arm in one direction will rotate the shaft on which it is mounted and wind the spring attached thereto, and means to operate said actuating means.

11. A motor comprising a line shaft, a plurality of spring shafts arranged concentrically about the power shaft and geared thereto, power springs each attached at one end to its shaft and at the other end to the gearing, a plurality of actuating arms mounted one on each shaft, means for imparting an oscillatory movement to said arms, and means whereby movement of an arm in one direction will rotate the shaft on which it is mounted and wind the spring attached thereto, comprising a master spring geared to said motor.

12. A motor comprising a line shaft, a plurality of spring shafts arranged concentrically about the power shaft and geared thereto, power springs each attached at one end to its shaft and at the other end to the gearing, a plurality of actuating arms mounted one on each shaft, means for imparting an oscillatory movement to said arms, means whereby movement of an arm in one direction will rotate the shaft on which it is mounted and wind the spring attached thereto, and means to continuously operate said actuating means.

13. A motor comprising a line shaft, a plurality of spring shafts arranged concentrically about the power shaft and geared thereto, power springs each attached at one end to its shaft and at the other end to the gearing, a plurality of actuating arms mounted one on each shaft, means for imparting an oscillatory movement to said arms, means whereby movement of an arm in one direction will rotate the shaft on which it is mounted and wind the spring attached thereto, and means to continuously operate said actuating means, comprising a rewinding unit having a spring relatively larger than the said power springs and geared to said actuating means.

14. A spring motor comprising a power shaft, spring means geared to said shaft for transmission of energy thereto, and automatically acting, controlled spring means to wind the springs during transmission of energy to the power shaft.

15. A spring motor comprising a power shaft, spring means geared to said shaft and adapted to transmit a portion of the spring energy thereto, and automatically acting, controlled spring means to restore to the springs an amount of energy equal to that transmitted to the power shaft, and control means effective to permit a flow of energy in a direction from the replenishing means to the spring means and to the power shaft only.

16. A spring motor comprising a power shaft and a power spring, gearing interconnecting said spring and shaft, automatically acting, controlled spring means to rewind the spring, said means adapted to wind the spring an amount equal to the unwinding thereof in rotating the power shaft and during said rotation.

17. A spring motor comprising a frame, a power shaft supported therein, a plurality of power springs mounted in said frame and geared to said shaft, for operation thereof, automatically acting, controlled spring means to wind said springs, and controlling means adapted to permit a winding of the power springs in proportion to the unwinding thereof, and simultaneously with said unwinding.

18. A spring motor comprising a frame, a power shaft supported therein, a plurality of power springs mounted in said frame and geared to said shaft for operation thereof, automatically acting, controlled spring means to wind said springs, and controlling means adapted to permit a winding of the power springs in proportion to the unwinding thereof, and without cessation of the continuity of transmission of power to the power shaft.

19. A spring motor comprising a frame, a power shaft supported therein, power spring supported therein, and geared to said shaft for actuation thereof, automatically acting, controlled spring means to wind said springs during the operation of said shaft and controlling means interposed between said winding means and said power springs effective to permit a winding thereof in proportion to the unwinding thereof and without cessation in the continuity of transmission of power to the power shaft.

20. A motor comprising a line shaft, a plurality of shafts arranged concentrically about the line shaft and geared thereto, springs acting on the plurality of shafts, and means for winding the springs, comprising rocker arms connected to said shafts, a tappet disk mounted to actuate said arms, and a master spring geared to said disk for operation thereof.

21. A motor comprising a line shaft, a plurality of spring shafts arranged concentrically about the line shaft and geared thereto, motor springs attached to the spring shafts and the gears thereon, a plurality of rocker arms, means including a movable tappet disk for actuating said arms, and means operative upon movement of said arms in one direction to turn the spring shafts and wind the springs, said means permitting the arms to move in the opposite direction free of the shaft.

22. A motor comprising a line shaft, a plurality of spring shafts arranged concentrically about the line shaft and geared thereto, motor springs attached to the spring shafts and the gears thereon, a plurality of rocker arms, a main winding spring, a disk, tappets on one side of the disk, a train of gearing operatively connecting the main winding spring with said disk, means yieldably holding the arms in the path of the tappets whereby the arms will be rocked intermittently, and means whereby movement of said arms in one direction will turn the spring shafts and wind the springs and movement of the arms in the opposite direction will be free of the shaft.

23. A motor, comprising a line shaft, a plurality of shafts arranged concentrically about the line shaft and geared thereto, springs acting on the plurality of shafts, means for winding the springs, comprising a master spring rewinding unit, and means to clutch said unit to the concentrically arranged spring shafts.

24. A motor, comprising, a line shaft, a plurality of spring shafts arranged concentrically about the line shaft and geared thereto, motor springs attached to the spring shafts and the gears thereon, a plurality of rocker arms, means for actuating said arms intermittently, a rewinding unit, and means to clutch the arms to the spring shafts whereby movement of the arms by the rewinding unit will turn the spring shafts and wind the springs, and means to de-clutch the arms whereby movement of the arms in the opposite direction will be free of the shafts.

25. A motor, comprising, a line shaft, a plurality of spring shafts arranged concentrically about the line shaft and geared thereto, motor springs attached to the spring shafts and the gears thereon, a plurality of rocker arms, means for actuating said arms intermittently, comprising a driven disc having tappets thereon, said disc being adapted to move the tappets into engagement with the arms, thereby to move the arms, and means whereby movement of said arms in one direction will turn the spring shafts and wind the springs, comprising a pair of clutches on each of said shafts, one of said clutches being adapted to connect an arm to its shaft upon winding movement, and disengage said arm upon movement in the opposite direction, the other of said clutches being adapted to permit movement of said shaft in winding direction only.

In testimony whereof I hereunto affix my signature.

GEO. O. JOYNER.